(12) United States Patent
Abadi et al.

(10) Patent No.: US 10,028,100 B2
(45) Date of Patent: Jul. 17, 2018

(54) METHODS AND SYSTEMS FOR IMPROVING ACCURACY OF INDOOR POSITIONING

(71) Applicant: International Business Machines Corporation, Armonk, NY (US)

(72) Inventors: Aharon Abadi, Petach Tikva (IL); Roie Melamed, Haifa (IL); Eli Packer, Givataim (IL); Natalie Shapira, Moshav Hadid (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/193,153

(22) Filed: Jun. 27, 2016

(65) Prior Publication Data

US 2017/0374525 A1 Dec. 28, 2017

(51) Int. Cl.
- *H04W 4/02* (2018.01)
- *H04B 17/318* (2015.01)
- *H04W 4/04* (2009.01)

(52) U.S. Cl.
CPC .......... *H04W 4/027* (2013.01); *H04B 17/318* (2015.01); *H04W 4/023* (2013.01); *H04W 4/043* (2013.01)

(58) Field of Classification Search
CPC ....... H04W 4/02; H04W 4/023; H04W 4/025; H04W 4/028; H04W 4/027; H04W 4/22; H04B 17/0085; H04B 17/21; H04B 17/24; H04B 17/29; H04B 17/309; H04B 1/69

See application file for complete search history.

(56) References Cited

U.S. PATENT DOCUMENTS

| | | | |
|---|---|---|---|
| 9,244,152 B1 | 1/2016 | Thiagarajan | |
| 2012/0313817 A1* | 12/2012 | Underbrink | G01S 19/37 342/357.72 |
| 2014/0011518 A1* | 1/2014 | Valaee | H04W 64/00 455/456.1 |
| 2016/0054440 A1* | 2/2016 | Younis | G01S 13/753 342/5 |

FOREIGN PATENT DOCUMENTS

| | | |
|---|---|---|
| CN | 103281778 | 9/2013 |
| WO | 2014113882 | 7/2014 |

\* cited by examiner

*Primary Examiner* — Diane Mizrahi

(57) ABSTRACT

A computerized method of improving position measurement of an indoor positioning system (IPS), comprising: gathering a plurality of position samples of a mobile device measured by an indoor wireless device, each of the position samples is indicative of a measured position and a measurement time; receiving a current position sample of the mobile device; for each of the plurality of position samples and the current position sample, determining a time weight, the time weight is higher for samples measured at a later time; for each of the plurality of position samples and the current position sample, determining a signal weight, the signal weight is higher for measured with stronger signal; and estimating a current position of the mobile device by weighting at least some of the position samples with the respective weights.

14 Claims, 4 Drawing Sheets

METHODS AND SYSTEMS FOR IMPROVING ACCURACY OF INDOOR POSITIONING

BACKGROUND

The present invention, in some embodiments thereof, relates to accuracy of indoor positioning and, more particularly, but not exclusively, to improving the accuracy by cleaning and smoothing position measurements.

Indoor positioning systems (IPS) provide online detection capabilities for localizing mobile devices. An IPS can locate mobile devices inside a building using radio waves, magnetic fields, acoustic signals, and/or other sensory information collected by mobile devices. In recent years, radio waves-based IPS systems have become very popular as they can locate smartphones by tracking the device's Wi-Fi or BLE (Bluetooth Low Energy) signals. Together with mobile, this position tracking can be leveraged to support high-value services such as indoor location based analytics (e.g., understanding customer traffic), real-time engagements (e.g., sending the customer a mobile coupon for a shirt when the customer is standing near it), asset management (e.g., tracking medical equipment in hospitals) and indoor navigation (e.g., in hospitals and malls). These services and solutions can transform the user experience for customers in the retail and travel and transportation domains.

The most popular indoor localization systems use Wi-Fi-based technologies since they can be based on existing Wi-Fi networks, which are widely available and do not require the device or person to take action such as opting-into the sensing or installing a mobile application.

SUMMARY

According to an aspect of some embodiments of the present invention there is provided a computerized method of improving position measurement of an indoor positioning system (IPS), comprising: gathering a plurality of position samples of a mobile device measured by an indoor wireless device, each of the position samples is indicative of a measured position and a measurement time; receiving a current position sample of the mobile device; for each of the plurality of position samples and the current position sample, determining a time weight, the time weight is higher for samples measured at a later time; for each of the plurality of position samples and the current position sample, determining a signal weight, the signal weight is higher for samples measured with stronger signal; and estimating a current position of the mobile device by weighting at least some of the position samples with the respective weights.

Optionally, the method further comprises: receiving a next position sample of the mobile device; estimating a movement velocity of the mobile device from the estimated current position and the next position sample; when the movement velocity is lower than a predetermined maximal velocity, adding the next position sample to the dataset.

Optionally, the indoor wireless device is a Wi-Fi access point device.

Optionally, the estimating is done for a time earlier than measurement time of at least one of the position samples.

Optionally, the time weight is the difference between the measurement time of each position sample and a window start time.

More optionally, the time weight is normalized by subtracting the difference by the sum of the time weight of at least some of the plurality of position samples.

Optionally, the signal weight is a linear function of a received signal strengths indication (RSSI) of each sample.

More optionally, the signal weight is normalized by subtracting the RSSI by the sum of the RSSIs of at least some of the plurality of position samples.

According to some embodiments of the invention there is provided a computer readable medium comprising computer executable instructions adapted to perform the method.

According to an aspect of some embodiments of the present invention there is provided a computerized method of improving position measurement of an indoor positioning system (IPS), comprising: gathering at least one position sample of a mobile device measured by an indoor wireless device, indicative of a measured position and a measurement time; receiving a current position sample of the mobile device; estimating a movement velocity of the mobile device from the at least one position sample and the current position sample; when the movement velocity is higher than a predetermined maximal velocity, marking the current position sample as noise.

Optionally, the method further comprises: when the movement velocity is lower than a predetermined maximal velocity, adding the current position sample to the dataset.

Optionally, the estimating is based on an inaccuracy radius of the indoor wireless device.

Optionally, the maximal velocity is determined based on an average walking speed of a person.

Optionally, the at least one position sample includes a weighted average position calculated by: for each of a plurality of position samples, determining a time weight, the time weight is higher for samples measured at a later time; for each of the plurality of position samples, determining a signal weight, the signal weight is higher for samples measured with stronger signal; and estimating a weighted position of the mobile device by weighting as least some of the position samples with the respective weights.

According to some embodiments of the invention there is provided a computer readable medium comprising computer executable instructions adapted to perform the method.

According to an aspect of some embodiments of the present invention there is provided a system of improving position measurement of an indoor positioning system (IPS), comprising: an indoor wireless device for measuring a plurality of position samples of a mobile device, each of the position samples is indicative of a measured position and a measurement time; a dataset for storing the plurality of position samples; and a processor for: for each of the plurality of position samples and the current position sample, determining a time weight, the time weight is higher for samples measured at a later time; for each of the plurality of position samples and the current position sample, determining a signal weight, the signal weight is higher for samples measured with stronger signal; and estimating a current position of the mobile device by weighting at least some of the position samples with the respective weights.

According to an aspect of some embodiments of the present invention there is provided a software program product for improving position measurement of an indoor positioning system (IPS), comprising: a non-transitory computer readable storage medium; a dataset for storing a plurality of position samples of a mobile device measured by an indoor wireless device, each of the position samples is indicative of a measured position and a measurement time; first program instructions for receiving a current position sample of the mobile device; second program instructions for determining, for each of the plurality of position samples and the current position sample, a time weight, the time weight is higher for samples measured at a later time; third program instructions for determining, for each of the plurality of position samples and the current position sample, a signal weight, the signal weight is higher for samples measured with stronger signal; and fourth program instructions for estimating a current position of the mobile device by weighting at least some of the position samples with the respective weights; wherein the first, second, third and fourth program instructions are executed by at least one computerized processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
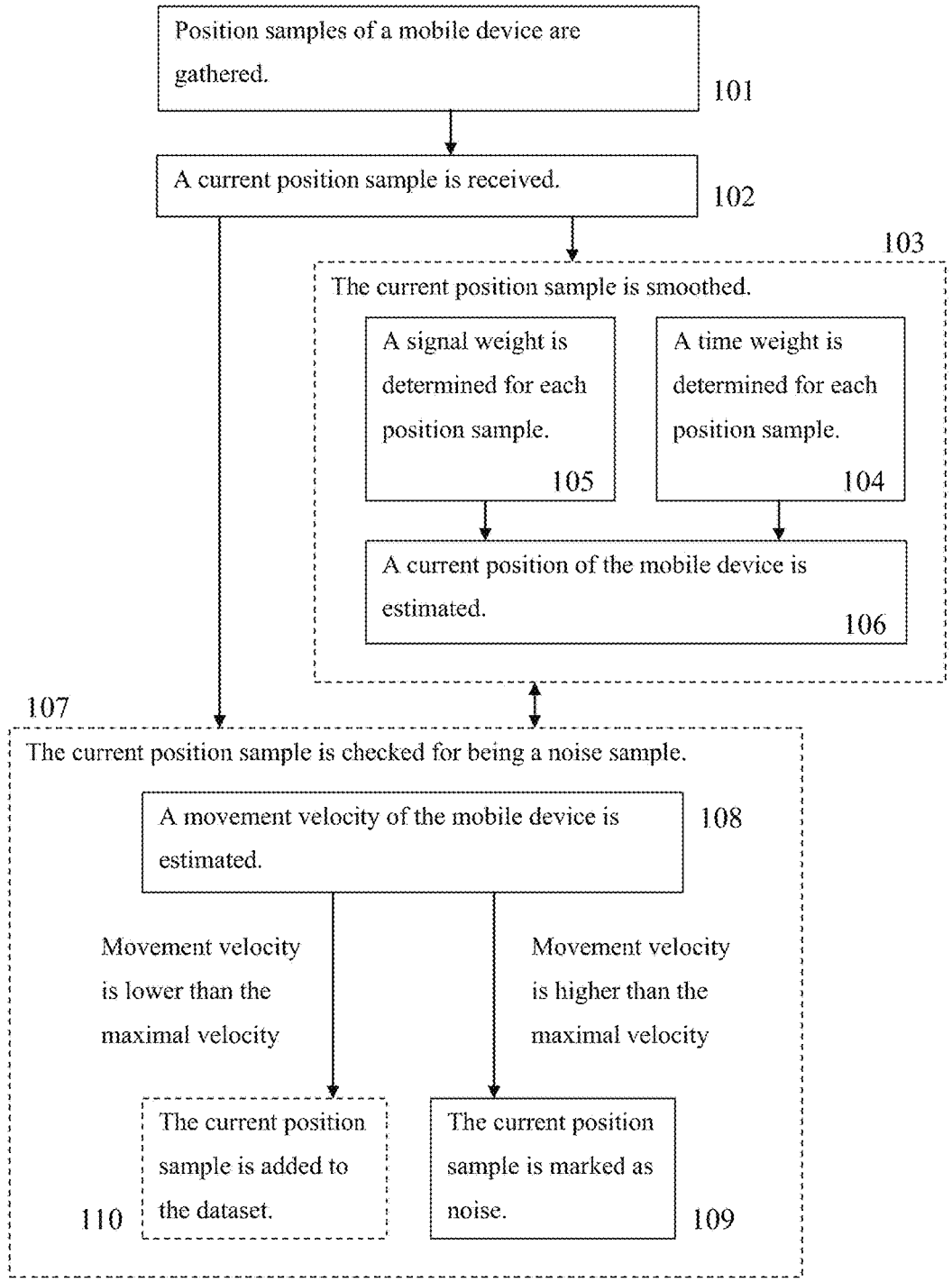
FIG. 1 is a flowchart schematically representing a method for improving position measurement of an indoor positioning systems (IPS), according to some embodiments of the present invention.

The present invention, in some embodiments thereof, relates to accuracy of indoor positioning and, more particularly, but not exclusively, to improving the accuracy by cleaning and smoothing position measurements.

Compared to outdoor positioning, indoor positioning is inherently more complex and less accurate for two main reasons. First, in an indoor venue, the signals are attenuated and scattered by static obstacles such as walls and "dynamic obstacles" such as people. This is different from outdoors, where the lines of sight from the GPS satellites are usually visible. Second, in an indoor venue there is typically no fixed network of roads, unlike the outdoor roads network that may be leveraged (e.g., by navigation applications applying snap-to-grid methods) to achieve high positioning accuracy. These challenges motivate the use of data cleansing to improve the accuracy of indoor position data.

According to some embodiments of the present invention, there are provided methods and systems of estimating current position integrating indoor positioning system (IPS) position samples, so each sample is weighted according to time and signal strength. Position samples of a mobile device, such as a smartphone, are measured by an indoor wireless device, such as Wi-Fi access point (AP). For each sample, a time weight, higher for newer samples, and a signal weight, higher for stronger samples, are calculated. The sample strength may be indicated by the sample's received signal strengths indication (RSSI). A current position of the mobile device is estimated, for example by calculating weighted average.

According to some embodiments of the present invention, there are provided methods and systems of removing IPS noise. For any new position sample, an estimated movement velocity of the mobile device is estimated based on previous position sample(s). When the estimated movement velocity is larger than a reasonable movement velocity, the new position sample is removed or disregarded as noise.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
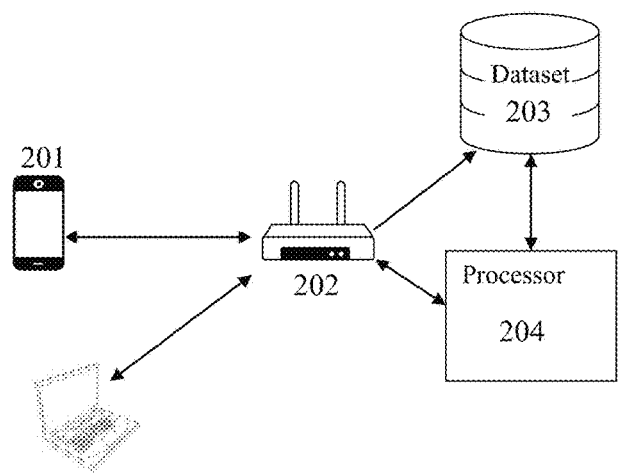
FIG. 2 is a schematic illustration of a device/system of improving position measurement of an IPS, according to some embodiments of the present invention.

Referring now to the drawings, FIG. 1 is a flowchart schematically representing a method for improving position measurement of an IPS, according to some embodiments of the present invention. Reference is also made to FIG. 2, which is a schematic illustration of a device/system of improving position measurement of an IPS, according to some embodiments of the present invention.

First, as shown at 101, position samples of a mobile device 201 measured by an indoor wireless device 202 are gathered. Each of the position samples includes a measured position and a measurement time.

Mobile device 201 may include, for example, a smartphone, a tablet, a wearable device such as Google glass, a Smart watch, a laptop computer, and/or any electronic device that includes transmission device, such as Wi-Fi communication device.

Indoor wireless device 202 may include, for example, a Wi-Fi AP device, a Wi-Fi router and/or any other IPS or device having IPS capabilities.

Optionally, the position samples are stored in a dataset 203. Dataset 203 may be any kind of structured data collection that allows access to stored data and may be stored, for example, in a digital data storage unit such as a magnetic drive and/or a solid state drive. Dataset 203 may be included in indoor wireless device 202 or may operate separately.

A computerized processor 204 executes instructions to perform the method from a non-transitory computer readable storage medium. Processor 204 and/or the storage medium may be included in indoor wireless device 202 or may be included in a separate device. For example, processor 204 and/or the storage medium may be part of a personal computer, a workstation, a mobile device, a server which may include one or more computing devices, and/or any other computer device. Processor 204 and/or the storage medium may be connected to indoor wireless device 202 via a network, for example local area network (LAN), a wireless network such as mobile network, wireless local area network (WLAN) such as Wi-Fi, a wireless personal area network (WPAN) such as Bluetooth protocol and/or any other network.

Then, as shown at 102, a current position sample of mobile device 201 is received by a transmitter and forwarded to processor 204 and/or dataset 203.

Then, as shown at 103, the current position sample is smoothed according to the position samples stored in dataset 203, as described in 104-106. As shown at 104, for each of the position samples, a time weight is determined. The time weight is higher for samples measured at a later time. For example, the time weight may be a linear function of the sample's timestamp value.

For example, the time weight formula for a position sample $P_i$ received at time $t_i$ may be: $weight_{time_i} = t_i - t$ where t denotes a window start time. Optionally, this is normalized to become:

$$weight_{time_i} = \frac{t_i - t}{\sum_{n=1}^{i} weight_{time_n}}.$$

As shown at 105, for each of the position samples, a signal weight is determined. The signal weight is higher for samples measured with stronger signal received by indoor wireless device 202. The signal weight may be an RSSI weight, and may be a linear function of the sample's RSSI value. This is because samples with stronger signal (i.e., ones with high RSSI values, usually closer to the AP) are known to be more accurate compared to those more distant from the set of APs.

For example, the RSSI weight formula for a position sample $P_i$ with RSSI value of $RSSI_i$ may be: $weight_{RSSI_i} = RSSI_i$. Optionally, this is normalized to become:

$$weight_{RSSI_i} = \frac{RSSI_i}{\sum_{n=1}^{i} RSSI_i}.$$

Then, as shown at 106, a current position of mobile device 201 is estimated by weighting at least some of the position samples with respective weights. The current position may be an average of valid positioning samples received within a time window (e.g. the period of time that effects the average position calculation). The weight of each such sample is composed from the time weight and an RSSI weight.

Optionally, a position of mobile device 201 is estimated for a previous time, also or only using samples that are received at a late time than the previous time.

Optionally, the current position may be estimated based on other weights and/or parameters, such as velocity.

For example, presented in Table 1 are five position samples arriving during 3.5 seconds—samples 1-4 stored in dataset 203 and a received current sample 5.

TABLE 1

| Sample number | Sample time | Sample RSSI | Sample |
|---|---|---|---|
| 1 | 0 | 20 | (0, 0) |
| 2 | 0.5 | 90 | (0, 1) |
| 3 | 1 | 60 | (0, 2) |
| 4 | 2 | 100 | (1, 1) |
| 5 | 3 | 50 | (0.5, 2) |

For example, when the time window is 3 seconds, the position at the time of the 5th sample will depend on samples 2-5. The effect of each sample is then a function of the time elapsed since it is received. A simple time weights of samples 2, 3, 4, and 5 may be 0.5, 1, 2 and 3 respectively. The ratio between the sample's RSSI and the average RSSI may be used as the RSSI weight. The average RSSI is 75. Therefore samples 4, 2, 3 and 5 may get RSSI weights of 4/3, 6/5, 4/5 and 2/3 respectively. In this case the total weight is 10.5 and the average position may be (0.4921, 1.508).

Then, optionally or alternatively to the smoothing shown at 103, the current position sample is checked for being a noise sample, as shown at 107.

A Wi-Fi-based positioning system has an inherent positioning inaccuracy. Hence, vendors define an inaccuracy radius R of about 3 to 5 meters for a given device, wherein at least 75% of the position samples are within an inaccuracy disk/circle whose center is the device's coordinates $(X_i, Y_i)$ and its radius is R. The disk may then be denoted by $D=((X_i, Y_i), R)$. A position sample that is within D is considered as a valid and one outside D is considered a noisy sample. However, in a commercial deployment such as a shopping mall, for dynamic devices such as smartphones, the sensing system may not infer whether a sample is noisy based on the disk alone, since the exact positioning of the device is unknown, therefore a noise filtering method as described below is required.

As shown at 108, a movement velocity of mobile device 201 is estimated from at least one previous position sample and the current position sample. For example, a simple mathematical formulation may be as follows: suppose $S_1$ and $S_2$ denote consecutive samples received at times $t_1$ and $t_2$, respectively. Then the movement velocity may be: $(S_1 - S_2)/(t_2 - t_1)$.

When the movement velocity is higher than a predetermined maximal velocity, the current position sample is marked as noise, as shown at 109. It is assumed that mobile device 201 may not travel faster than the predetermined maximal velocity. Therefore, when such a velocity is calculated, it is concluded that the later sample is noise. The current position sample may then be deleted or stored, for example in a separate dataset.

Optionally, when the movement velocity is lower than a predetermined maximal velocity, the current position sample is added to dataset 203, shown at 110.

Optionally, a more complex model may be applied. Assume that at time $t_i$ a mobile device $DEVICE_i$ is at coordinates $(X_i, Y_i)$. A position sample $P_i$ received at this time may be anywhere within $D=((X_i, Y_i), R)$ and still considered a valid (i.e., not noise) sample. Assume that the subsequent position sample $P_j$ with coordinates $(X_j, Y_j)$ is received at a time $t_j > t_i$. Assume also that $P_i$ is a valid sample and that each mobile device may move at a velocity lower than or equal to S kilometers per hour (kph) (i.e. S is the upper bound on the velocity at which a mobile device is "allowed" to move). According to the latter assumption, the Euclidean distance between $P_i$ and $P_j$ is denoted as $Distance_{i,j}$ divided by the time gap between these two samples ($t_j-t_i$) should be $\leq S$. However, the reported $P_i$ and $P_j$ coordinates may drift by at most R meters in both the X and Y directions yet still be considered valid samples. Hence, the above velocity condition is relaxed to include a drift of up to R meters from each sample, i.e., $$\frac{Distance_{i,j} - 2R}{t_j - t_i} \leq S.$$

When this condition is not met, $P_j$ is classified as a noisy sample. Optionally, the assumption that $P_i$ is a valid sample is relaxed by replacing it with the average position calculated by smoothing.

For parameter settings, R is typically set to be "a little bit less" than the claimed inaccuracy radius defined by the vendor, e.g., 2.5 meters. S is also typically set as the average walking speed of a person, which is around 4.5 kph. These conservative values are used for the following reasons: First, in the above velocity condition 2 R is subtracted from the "allowed" distance between $P_i$ and $P_j$. This subtraction implies the worst case (and not common) scenario in which both $P_i$ and $P_j$ drift (from a positioning perspective) by R meters to exactly opposing directions, whereas typically the combined drift is less than 2 R. Second, mobile devices are carried by people, who usually do not walk in straight lines. Moreover, in an indoor venue most of the devices/people are static or "semi-static" for long periods. These two arguments imply an effective smaller inaccuracy radius and allowed velocity.

In an exemplary implementation according to some embodiments of the present invention, the following algorithm is used:
cleanAndSmooth(samples,noiseThreshold):

```
1:   samplesHistory = create a list
2:   noiseHistory = create a list
3:   while system has more samples do
4:       nextSample = samples.getNext( )
5:       if !isNoise(nextSample) then
6:           smoothing(samplesHistory,nextSample)
7:           add nextSample to samplesHistory
8:       else
9:           add nextSample to noiseHistory
10:          if needToSwitch(noiseHistory,
             samplesHistory, noiseThreshold) then
11:              samplesHistory = smoothing(noiseHistory)
12:              noiseHistory.clear( )
13:          end if
14:      end if
15:  end while
```

The algorithm is composed from the noise reduction and data smoothing. The algorithm iterates over the samples (line 3); for each sample, it first checks if it is a noisy sample (line 5). When the current sample is a valid one, the smoothing technique is applied (line 6), and the calculated sample is saved in the samplesHistory list (line 7). When the current sample is noisy, it is added to the noisyHistory (line 9) rather than being deleted. This is done for two reasons: first, there is a small probability that this sample is actually a valid one mistakenly classified by the algorithm as a noisy sample; and second, a person (device) may exceed the maximal speed, for example in a multi-floor venue by using the elevator. Such a classification error may cause the algorithm to also classify subsequent samples as noisy ones, since a valid sample was eliminated from the data smoothing window. To overcome such cases, the auxiliary function needToSwitch checks when the head of the noiseHistory list is of size noiseThreshold. When so, the samplesHistory list is set to the noiseHistory head and the algorithm applies data smoothing on the new samplesHistory while emptying the noiseHistory list (lines 11-12).

For example, Table 2 and Table 3 show the result of an invocation of the algorithm on a static device in a lab during a "noise burst".

TABLE 2

| Sample number | Sample time | Sample map horizontal position | Sample map vertical position |
|---|---|---|---|
| 1 | 19:05:36 | 25.5 | 18.5 |
| 2 | 19:05:41 | 26.2 | 18.5 |
| 3 | 19:05:48 | 26.1 | 18.5 |
| 4 | 19:05:54 | 16.7 | 17.4 |
| 5 | 19:05:56 | 14.4 | 17.3 |
| 6 | 19:05:57 | 12.7 | 17.3 |
| 7 | 19:05:58 | 14.4 | 17.4 |
| 8 | 19:06:01 | 19.0 | 17.9 |
| 9 | 19:06:04 | 23.2 | 18.2 |

TABLE 3

| Sample number | Sample time | Sample map horizontal position | Sample map vertical position |
|---|---|---|---|
| 1 | 19:05:36 | 25.6 | 18.5 |
| 2 | 19:05:41 | 25.7 | 18.5 |
| 3 | 19:05:48 | 25.8 | 18.5 |
| 4 | 19:05:54 | 24.3 | 18.3 |
| 5 |  | Removed |  |
| 6 |  | Removed |  |
| 7 | 19:05:58 | 22.6 | 18.2 |
| 8 | 19:06:01 | 21.9 | 18.1 |
| 9 | 19:06:04 | 22.0 | 18.1 |

Before/after this "noise burst" the device is located around coordinates (25:5; 18:5). Table 2 and Table 3 include the positioning samples before and after the activation of the algorithm, respectively. The original first four positioning samples (lines 1-4 in Table 2) are valid samples, and hence they are adjusted to reflect the device's weighted average position (lines 1-4 in Table 3). These resulted weighted average positions are closer to the device's actual position than the raw (unprocessed) position samples generated by the sensing platform. Samples number 5 and 6 are detected as noise, and hence they are eliminated from the samples set and the position remains unchanged and very close to the device's actual position. In contrast, during this period, the position as determined by the sensing platform substantially drifts from the device's actual position. These two trends continue during the entire "noise burst".

To evaluate the performance of the method according to some embodiments of the present invention, empirical evaluation was made based on experiments run in a lab over the course of 24 hours. This 20×10 meter lab is equipped with a Wi-Fi-based sensing platform from a leading company in this domain. The platform collects RSSI signals from three APs and employs Wi-Fi-based trilateration to infer a device's position. Five mobile devices were used: four static devices and a single dynamic one. The position update frequency was not uniform across all the devices, but average update frequency was about one minute. The experiments took place under lab conditions with close to zero signal interference (e.g., people movement).

The algorithm was applied with S ranging from 2 kph to 8 kph, advancing in steps of 0.5 kph. This velocity parameter mainly affects the probability of detecting noisy samples. Since the experiments were done under the lab conditions described above (with no signal interference in a relatively small lab), the overall percentage of noisy samples was low. Consequently, the velocity value in the aforementioned range had a small effect on the overall performance of the algorithms. In all the experiments described below, this parameter was set to be 4.5 kph, as this represents the average walking speed in a shopping mall. The accuracy radius R was set to 2.5 meters as explained above.

Figure 3:
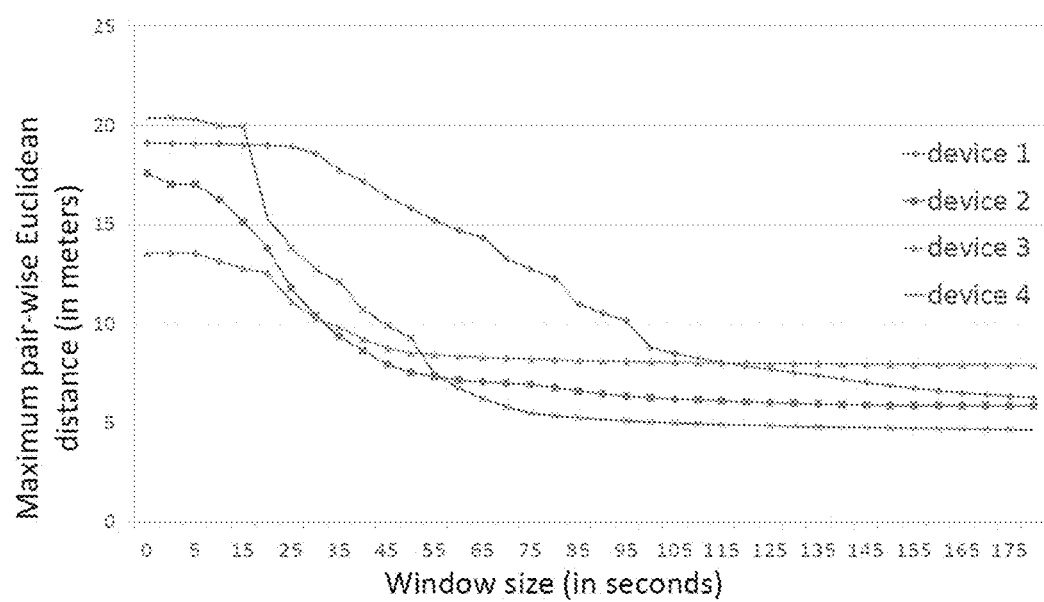
FIG. 3 is a graph showing the maximal Euclidean distance between a pair of position samples associated with a given device, according to some embodiments of the present invention.

Reference is now made to FIG. 3, which is a graph showing the maximal Euclidean distance (denoted as the noise level) between a pair of position samples associated with a given device, according to some embodiments of the present invention. Ideally, this distance should be zero for static devices. As the figure shows, without applying any data smoothing (window size equals to zero), the noise level may be more than twenty meters. As the window size is increased from zero to 60 seconds, there is a monotone decrease of the noise level from 13.5-20.4 meters to 5-8.8 meters, which demonstrates a 75.5% improvement in the data accuracy. Increasing the window size further up to 100 seconds results in a more moderate noise decrease. Hence, following this experiment, the window size was fixed at 60 seconds to achieve the best results for both static and dynamic devices.

Figure 4:
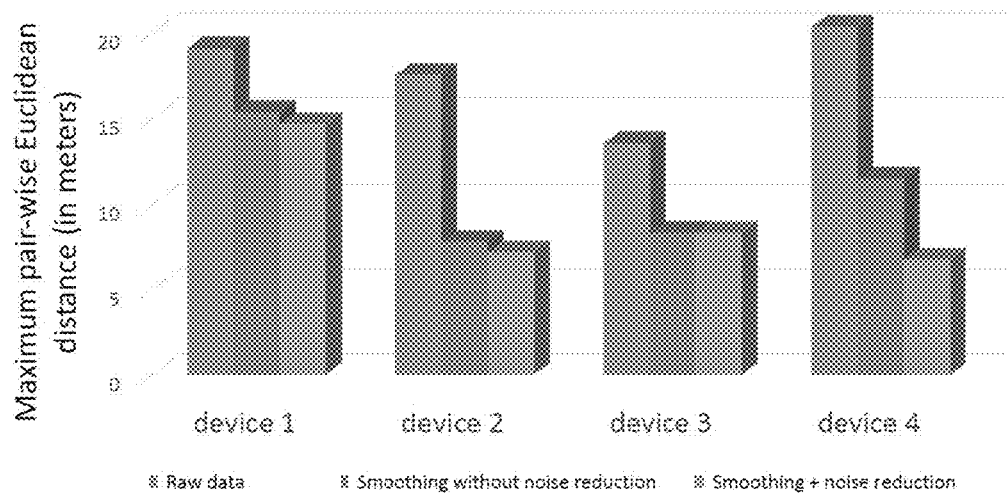
FIG. 4 is a graph showing the separate contributions of each of noise reduction and data smoothing to the improved data accuracy, according to some embodiments of the present invention.

Reference is now made to FIG. 4, which is a graph showing the separate contributions of each of the two sub-algorithms (noise reduction and data smoothing) to the improved data accuracy, according to some embodiments of the present invention. The noise level is again measured for each of the aforementioned static devices of FIG. 3. FIG. 4 shows the noise levels for:

i) raw position events;
ii) raw position events that have been processed by data smoothing; and
iii) similar to ii) with additional noise reduction.

The experiment took place under lab conditions which as shown in FIG. 4 resulted in a low percentage (about 1%) of noise (noisy samples). In real deployments this percentage is substantially higher indicating about the high noise levels induced by existing Wi-Fi-based sensing platforms. However, even under lab conditions it is evident that these platforms are far from accurate, as shown by the experiments. Applying the data smoothing algorithm on raw position data resulted in a substantial reduction in the noise level for all four devices: between 3.74 meters/19.56% for device number 1 and 9.74 meters/55.45% for device number 2. The additional reduction in the noise level from applying noise reduction in addition to data smoothing was significant only for device number 4 (4.78 meters/23.45%) and minor for the other three devices as explained above.

Figure 5:
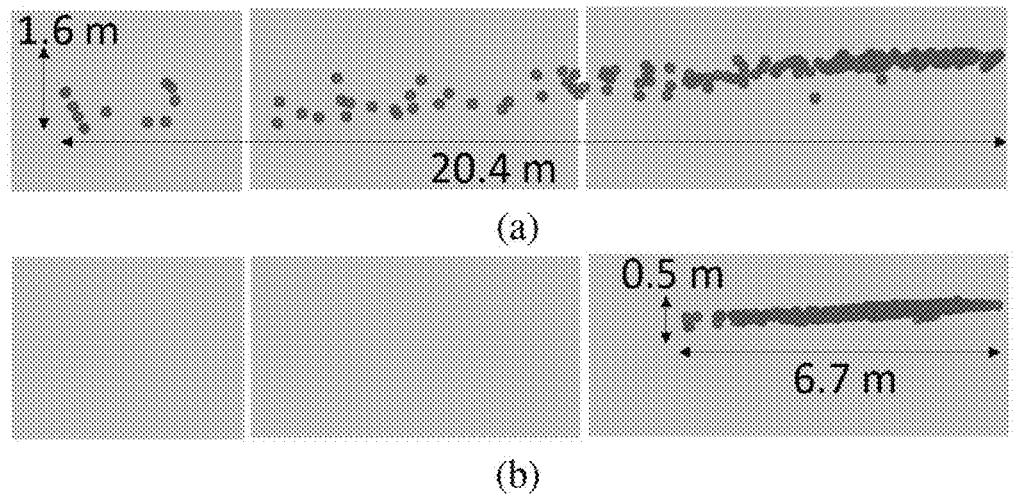
FIG. 5 is a graph showing position samples of a static device, throughout a 24-hour experiment in the lab, before (a) and after (b) activation of the algorithm, according to some embodiments of the present invention.

Reference is now made to FIG. 5, which is a graph showing position samples of a static device, throughout a 24-hour experiment in the lab, before (a) and after (b) activation of the algorithm, according to some embodiments of the present invention. Although the device is static, throughout a long experiment the device's position samples may be scattered across a very big area whose diameter is more than 20 meters. After applying the algorithm on this data, the position samples are centered across an area that is about ⅓ of the area in which the raw position samples are scattered.

Figure 6A:
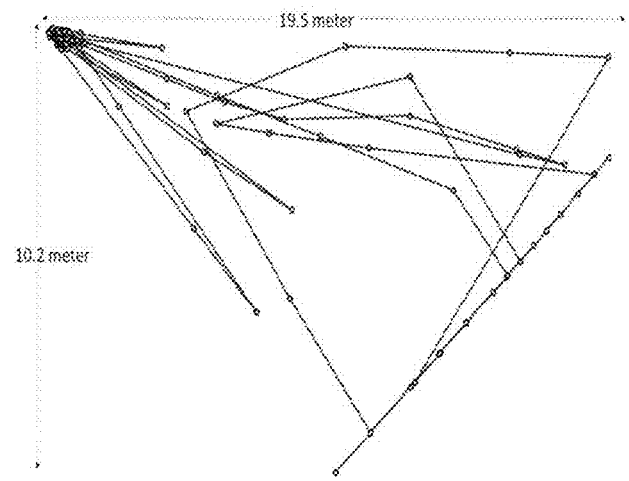
FIGS. 6A-6B are graphs showing position samples of a dynamic device in the lab before and after the application of the algorithm, respectively, according to some embodiments of the present invention.
Figure 6B:
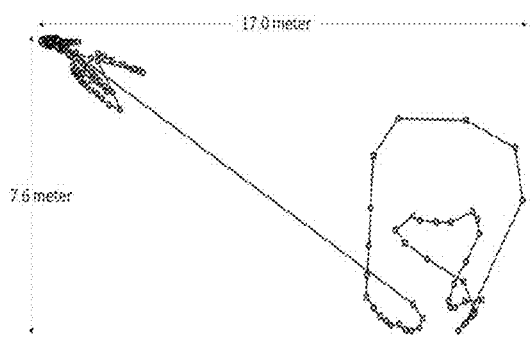

Reference is now made to FIGS. 6A-6B, which are graphs showing position samples of a dynamic device in the lab before and after the application of the algorithm, respectively, (with the previously described parameters), according to some embodiments of the present invention. Ideally, these samples should construct relatively straight and smooth trajectories, which represent person's walking pattern. As evident, application of the algorithm generates a much smoother trajectory that includes substantially less "bouncing".

To formally quantify the improvement in the smoothness of the generated trajectory following the application of the algorithm, we use the following two well-known techniques: Derivation and Fitting curves. The two methods offer strong evidence to the usefulness of the smoothing: the significant decrease of the magnitudes obtained with both methods demonstrates natural movement that is more likely to match reality.

Derivation.

For each sequence of samples C (either from the raw data or the smoothed one), the curvature is considered. Revising the notion of derivation, consecutive sample points in the computation is discretely considered. In this sense, the first and second derivatives are defined as follows. Let $s_i=(x_i, y_i)$ be any sample and let $v_i=(x_{i+1}-x_i, y_{i+1}-y_i)$ be the vector directed from $S_i$ to $S_{i+1}$. Let $\beta_i=a\tan 2(y_i, x_i)$ be the angle of $v_i$ with respect to the x-axis. The first derivative is defined as the angular difference between two consecutive vectors:

$$\frac{dC}{dv_{i+1}} = \alpha_{i+1} = \beta_{i+1} - \beta_i.$$

Figure 7:
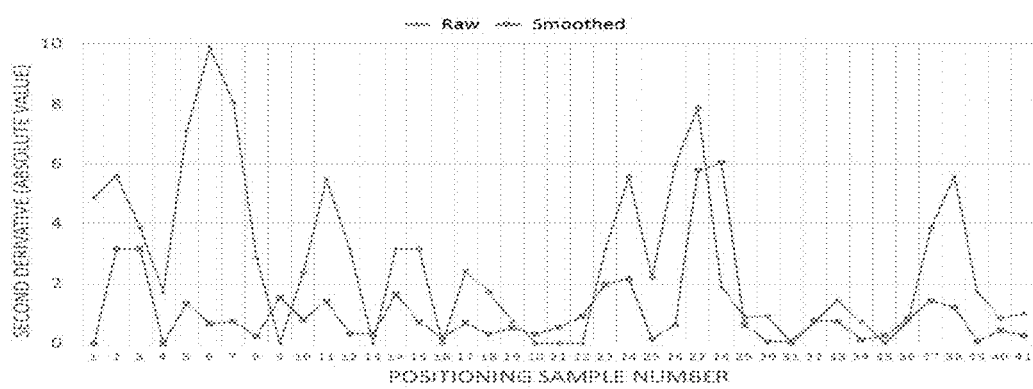
FIG. 7 is a graph showing second derivative results for position samples of dynamic device for the raw and smoothed data, according to some embodiments of the present invention.

The second derivative $$\frac{d^2C}{dv_{i+1}^2} = \alpha_{i+1} - \alpha_i$$

is also considered. The rationale is that these two values measure the smoothness of the curve: the first derivative penalizes turns while the second derivative penalizes the difference in the magnitude of the turns (so walking in a perfect circle will have no penalty). The assumption is that a smooth walking path is preferred over a zigzagged walking path since it simulates a normal walking pattern. Reference is now made to FIG. 7, which is a graph showing second derivative (absolute value) results for position samples of dynamic device for the raw and smoothed data, according to some embodiments of the present invention. In a whole, the smoothing decreases the first and second derivatives up to a 10 fold improvement. It is evident in FIG. 7 where except from a few locations, the second derivative decreases substantially. However, there are cases where the derivatives increase (as in sample 28 in FIG. 7); this is the result of perturbing a short sequence of positions that originally lie on straight lines.

Fitting Curves.

Low-degree polynomial curves are fitted to each trajectory using for example Gradient Descent and/or other or more sophisticated techniques. The errors of the sampling data are also measured with respect to the obtained curves (i.e., their distances from the curves). It is evident from FIG. 4 that smoothing the data decreases the errors significantly.

The methods as described above may be used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant IPSs will be developed and the scope of the term IPS is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of improving position measurement of an indoor positioning system (IPS), comprising:
    gathering, at a server, indoor position data of a mobile device by:
        gathering from an indoor wireless device a plurality of position samples of the mobile device, the plurality of position samples are measured at the indoor wireless device, each of said plurality of position samples is indicative of a measured position and a measurement time;
        receiving a current position sample of said mobile device;
    for each of said plurality of position samples and said current position sample, using at least one processor of the server for determining a time weight, said time weight is higher for samples measured at a later time;
    for each of said plurality of position samples and said current position sample, using the at least one processor of the server for determining a signal weight, said signal weight is higher for samples measured with stronger signal; and
    adding a current position of said mobile device to the indoor position data, the current position of said mobile device is estimated by weighting at least some of said position samples with said respective weights to improve an accuracy of the indoor position data.

2. The method of claim 1, further comprising:
    receiving a next position sample of said mobile device;
    estimating a movement velocity of said mobile device from said estimated current position and said next position sample;
    when said movement velocity is lower than a predetermined maximal velocity, adding said next position sample to a dataset.

3. The method of claim 1, wherein said indoor wireless device is a Wi-Fi access point device.

4. The method of claim 1, wherein said estimating is done for a time earlier than measurement time of at least one of said position samples.

5. The method of claim 1, wherein said time weight is the difference between the measurement time of each position sample and a window start time.

6. The method of claim 5, wherein said time weight is normalized by subtracting said difference by the sum of the time weight of at least some of said plurality of position samples.

7. The method of claim 1, wherein said signal weight is a linear function of a received signal strengths indication (RSSI) of each sample.

8. The method of claim 7, wherein said signal weight is normalized by subtracting said RSSI by the sum of the RSSIs of at least some of said plurality of position samples.

9. A computerized method of improving position measurement of an indoor positioning system (IPS), comprising:
  gathering indoor position data of a mobile device by:
    gathering at least one position sample of the mobile device from an indoor wireless device, the at least one position sample is measured at the an indoor wireless device, indicative of a measured position and a measurement time,
    receiving, at a server, a current position sample of said mobile device,
    using at least one processor of the server for estimating a movement velocity of said mobile device from said at least one position sample and said current position sample, and
  wherein when said movement velocity is higher than a predetermined maximal velocity, marking said current position sample as noise to improve an accuracy of the indoor position data.

10. The method of claim 9, further comprising:
  when said movement velocity is lower than a predetermined maximal velocity, adding said current position sample to a dataset.

11. The method of claim 9, wherein said estimating is based on an inaccuracy radius of said indoor wireless device.

12. The method of claim 9, wherein said maximal velocity is determined based on an average walking speed of a person.

13. The method of claim 9, wherein said at least one position sample includes a weighted average position calculated by:
  for each of a plurality of position samples, determining a time weight, said time weight is higher for samples measured at a later time;
  for each of said plurality of position samples, determining a signal weight, said signal weight is higher for samples measured with stronger signal; and
  estimating a weighted position of said mobile device by weighting as least some of said position samples with said respective weights.

14. A system of improving position measurement of an indoor positioning system (IPS), comprising:
  an indoor wireless device for measuring a plurality of position samples of a mobile device, each of said position samples is indicative of a measured position and a measurement time;
  a dataset for storing indoor position data of the mobile device and said plurality of position samples; and
  a processor for:
    for each of said plurality of position samples and said current position sample, determining a time weight, said time weight is higher for samples measured at a later time;
    for each of said plurality of position samples and said current position sample, determining a signal weight, said signal weight is higher for samples measured with stronger signal; and
    adding a current position of said mobile device to the indoor position data, the current position is estimated by weighting at least some of said position samples with said respective weights to improve an accuracy of the indoor position data.

* * * * *